(12) United States Patent
Kiss et al.

(10) Patent No.: US 9,277,571 B2
(45) Date of Patent: Mar. 1, 2016

(54) REGISTRATIONS IN A COMMUNICATION SYSTEM

(75) Inventors: Krisztian Kiss, San Diego, CA (US); Gabor Bajko, Budapest (HU)

(73) Assignee: Nokia Technologies Oy, Espoo (FI)

( * ) Notice: Subject to any disclaimer, the term of this patent is extended or adjusted under 35 U.S.C. 154(b) by 2690 days.

(21) Appl. No.: 10/733,635

(22) Filed: Dec. 12, 2003

(65) Prior Publication Data

US 2004/0230697 A1 Nov. 18, 2004

(30) Foreign Application Priority Data

May 13, 2003 (GB) .................................. 0311006.1

(51) Int. Cl.
| | | |
|---|---|---|
| *G06F 15/16* | (2006.01) | |
| *H04W 76/02* | (2009.01) | |
| *H04L 29/06* | (2006.01) | |
| *H04W 8/18* | (2009.01) | |
| *H04W 28/06* | (2009.01) | |

(52) U.S. Cl.
CPC ........... *H04W 76/02* (2013.01); *H04L 65/1016* (2013.01); *H04L 65/1073* (2013.01); *H04W 8/18* (2013.01); *H04W 28/06* (2013.01)

(58) Field of Classification Search
USPC ................. 709/228; 455/435.1, 433, 432.3
See application file for complete search history.

(56) References Cited

U.S. PATENT DOCUMENTS

| | | | |
|---|---|---|---|
| 6,643,365 B1 | | 11/2003 | Dunn et al. |
| 6,822,945 B2 * | | 11/2004 | Petrovykh ..................... 370/270 |
| 7,028,101 B2 * | | 4/2006 | Costa-Requena et al. .... 709/245 |
| 7,085,260 B2 * | | 8/2006 | Karaul et al. ................. 370/352 |
| 7,177,642 B2 * | | 2/2007 | Sanchez Herrero et al. ......................... 455/435.1 |
| 7,478,151 B1 * | | 1/2009 | Maiocco et al. .............. 709/223 |
| 2002/0147845 A1 * | | 10/2002 | Sanchez-Herrero et al. . 709/245 |
| 2003/0018684 A1 * | | 1/2003 | Ohsawa et al. ............... 709/102 |

FOREIGN PATENT DOCUMENTS

| | | |
|---|---|---|
| JP | 11-27391 | 1/1999 |
| JP | 2001268236 A | 9/2001 |
| JP | 2001268239 A | 9/2001 |
| WO | WO 03/005669 A1 | 1/2003 |

OTHER PUBLICATIONS

Rosenberg, Caller Preferences and Callee Capabilities for the Session Initiation Protocol (SIP), Mar. 2, 2003, pp. 1-58.*

"3$^{rd}$ *Generation Partnership Project; Technical Specification Group Services and System Aspects; IP Multimedia Subsystem (IMS); Stage 2 (Release 6)*", 3GPP TS 23.228 V6.1.0, Technical Specification, XP-002296375, Mar. 1, 2003, pp. 1-137.

(Continued)

*Primary Examiner* — Sulaiman Nooristany

(74) *Attorney, Agent, or Firm* — Mintz Levin Cohn Ferris Glovsky and Popeo, P.C.

(57) ABSTRACT

A method in a communication system processes incoming requests at a controller entity. The method comprises the steps of registering a plurality of contact addresses for a user in a controller entity, receiving a request at the controller entity for a communication link to the user, querying a user information storage for information regarding a manner regarding how to handle the request, and processing the request in accordance with the information from the user information storage.

15 Claims, 2 Drawing Sheets

(56) References Cited

OTHER PUBLICATIONS

Rosenberg et al., "*SIP: Session Initiation Protocol*", Network Working group, RFC 3261, XP-002296376, Jun. 1, 2002, pp. 1-222.

Office Action dated Jan. 15, 2010, issued by the State Intellectual Property of China, issued in connection with counterpart Chinese patent application No. 200480012749.2.
Grant Certificate dated Nov. 4, 2009, issued by the European Patent Office for EP Pat. No. 1623539.

* cited by examiner

REGISTRATIONS IN A COMMUNICATION SYSTEM

BACKGROUND OF THE INVENTION

1. Field of the Invention

The invention relates to communication systems, and in particular to communication systems wherein a user may register an identity from multiple locations.

2. Description of the Related Art

A communication system can be seen as a facility that enables communication between two or more entities such as user equipment, communication network elements and other entities associated with the communication system. A communication system typically operates in accordance with a given standard or specification which sets out what the various entities associated with the communication system are permitted to do and how that should be achieved. For example, the standard or specification may define if the user, or more precisely, user equipment or terminal is provided with a circuit switched service and/or a packet switched service. Communication protocols and/or parameters which shall be used for the connection may also be defined. In other words, a specific set of "rules" on which the communication can be based on needs to be defined to enable communication by means of the system.

Communication systems proving wireless communication for user equipment are known. An example of the wireless systems is the public land mobile network (PLMN). The PLMNs are typically based on cellular technology. In cellular systems, a base transceiver station (BTS) or similar access entity serves mobile stations (MS) or other such wireless user equipment (UE) via a wireless interface between these entities. The communication between the user equipment and the elements of the communication network can be based on an appropriate communication protocol. The operation of the base station apparatus and other apparatus required for the communication can be controlled by one or several control entities. The various control entities may be interconnected. One or more gateway nodes may also be provided for connecting the cellular network to other networks. e.g. to a public switched telephone network (PSTN) and/or other communication networks such as an IP (Internet Protocol) and/or other packet switched networks.

An example of the services that may be offered for user such as the subscribers to a communication systems is the so called multimedia services. Some of the communication systems enabled to offer multimedia services are known as Internet Protocol (IP) Multimedia networks. IP Multimedia (IM) functionalities can be provided by means of a IP Multimedia Core Network (CN) subsystem, or briefly IP Multimedia subsystem (IMS). The IMS includes various entities for the provision of the multimedia services.

The communication systems have developed in the direction wherein various service provision functions of the network are handled by network entities known as servers. For example, in the current third generation (3G) wireless multimedia network architectures it is assumed that several different servers are used for handling different functions. These include functions such as the call session control functions (CSCFs). The call session functions may be divided into various categories such as a proxy call session control function (P-CSCF), interrogating call session control function (I-CSCF), and serving call session control function (S-CSCF). It shall be appreciated that the CSCFs may be also referenced to as the call state control functions.

Communication systems may be arranged such that a user, typically a subscriber, has to initiate communications over the communication system. For example, a user may request for a session, transaction or other type of communications from an appropriate communications network entity. Such communications can be seen as being originated from the user. From the above discussed network entities the serving call session control function (S-CSCF) forms the entity the user needs to be registered at in order to be able to request for a service from the communication system.

In certain specifications, such as the 3GPP Release 6, which is currently the latest version of the 3GPP specifications, the IMS networks are configured so as to allow the user to register a single public user identity from multiple locations using more than one contact addresses The multiple contact addresses may even relate to different terminals having access to multiple access networks. For example, the user may access the IMS via GPRS and/or WLAN networks with appropriate user equipment.

When proxying incoming requests, the network has the choice to route the request to all the registered contact addresses or only some of them. In order to make the most appropriate routing decision, the network needs some sort of preference settings both from the user and the network on handling the multiple contacts. More specifically, the network needs to decide whether it should fork a request or not. Subsequently, if forking is to be used, a decision is needed if sequential search or parallel forking is preferred. If sequential search is preferred, then it needs to be decided in what order the different contact addresses associated with the registered user identity should be contacted.

Internet Engineering Task Force (IETF) document RFC 3261 "SIP: Session Initiation Protocol" by J. Rosenberg, et al., June 2002, describes the concept of sequential search. The RFC 3261 document is incorporated herein by reference. In the sequential search a sequential trial is performed with multiple contacts based on the user's preference given by the so called q (preference) value. The q value is a parameter attached to the contact address, such as a Uniform Resource Identifier (URI). If an attempt to contact the most preferred contact fails, then the next preferred is tried, until a final response is received from one of the contact addresses. The RFC 3261 also describes the concept of parallel forking. In the parallel forking the different addresses are contacted simultaneously at the same time. That is, the network forks the incoming request to all of the registered contacts at the same time. Using the q values according to RFC 3261, the called party is able to manipulate per registration basis the preferences on handling the registered multiple contacts.

A proposal is that the caller can also indicate her preferences on handling a certain request. The caller preferences may overrule the called party preferences. This may be performed by using of a specific header field, i.e. the 'Request-Disposition' header field. The field specifies caller preferences for how a server of the terminating network should process the request where this header field is included. This has been proposed to be performed by using the following directives. A fork-directive is proposed to indicate whether a proxy should fork a request ("fork"), or proxy to only a single address ("no-fork"). If the server is requested not to fork, the server should proxy the request to the "best" address. The best address would normally be the one with the highest q-value. In case the fork-directive is set to "fork", then a parallel-directive indicates whether the caller would like the proxy server to proxy the request to all known addresses at once ("parallel"), or go through them sequentially, contacting the next address only after it has not received a final response for the previous one ("sequential").

However, if neither the called party preferences nor caller preferences are defined, the network behavior might be ambiguous. The terminating proxy server may require some configuration how it should behave in this "default case".

SUMMARY OF THE INVENTION

Embodiments of the invention address one or several of the above problems.

According to one embodiment of the invention, there is provided a method in a communication system for processing incoming requests at a controller entity. The method includes the steps of registering a plurality of contact addresses for a user in the controller entity, and receiving a request at the controller entity for a communication link to the user. The method also includes the steps of querying a user information storage for information regarding the manner regarding how to handle the request; and processing the request in accordance with the information from the user information storage.

According to another embodiment of the invention there is provided a communication system configured to service a user with a plurality of contact addresses. The communication system includes a multimedia network provided with a controller entity wherein the contact addresses of the user are registered and a user information storage configured to store information regarding a manner regarding how to handle request for the user, wherein the controller entity is configured to query the user information storage and to process requests for connections to the user in accordance with the information queried from the user information storage.

According to yet another embodiment of the invention there is provided a controller entity for a multimedia network, including a register for registering a plurality of contact addresses for a user and an interface to a user information storage configured to store information regarding a manner regarding how to handle request for the user, the controller entity being configured to query the user information storage and to process requests for connections to the user in accordance with the information queried from the user information storage.

The embodiments of the invention may provide various advantages. For example, the embodiments may allow the operator of the network to set the terminating proxy, i.e. terminating S-CSCF behavior in case neither caller preferences nor called party preferences are indicated. This allows, among other things, optimization of the operation of the communication system.

BRIEF DESCRIPTION OF THE DRAWINGS

For better understanding of the invention, reference will now be made by way of example to the accompanying drawings in which.

DETAILED DESCRIPTION OF THE PREFERRED EMBODIMENTS

Figure 1:
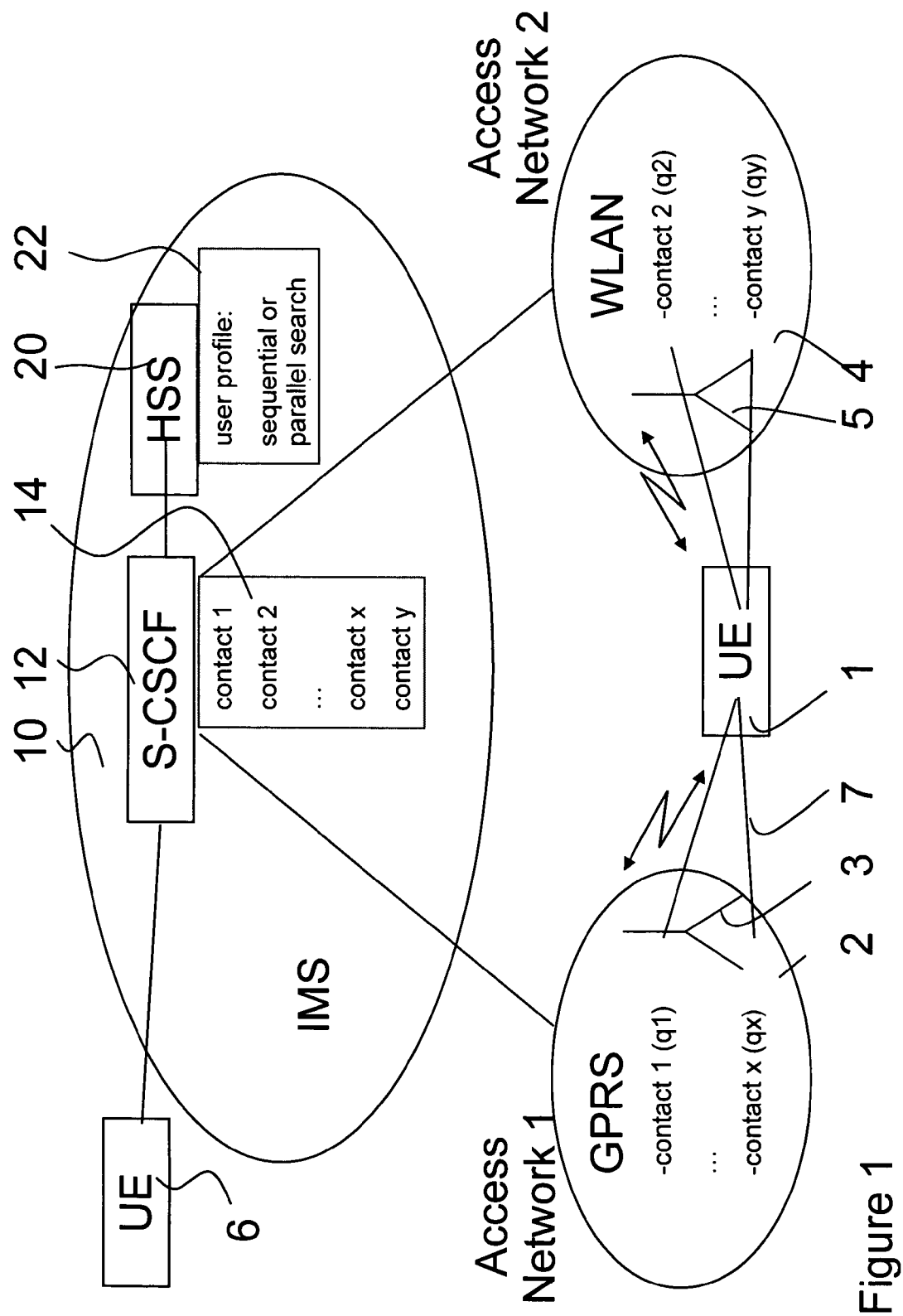
FIG. 1 shows a communication system wherein the invention may be embodied.

Reference is made to FIG. 1 which shows an example of a network architecture wherein the invention may be embodied. FIG. 1 shows an IP Multimedia Network 10. IP multimedia services may be offered for IP Multimedia Network subscribers. IP Multimedia (IM) functionalities can be provided by means of a Core Network (CN) subsystem including various entities for the provision of the service. The core network (CN) entities typically include various switching and other control entities and gateways for enabling the communication via a number of radio access networks and also for interfacing a single communication system with one or more communication system such as with other cellular systems and/or fixed line communication systems.

In the shown arrangement a user equipment 1 may access the IMS network 10 via two different access networks 2 and 4. The exemplifying network includes a General Packet Radio Service (GPRS) network 2 and a Wireless local area network (WLAN) 4. Each access network is provided with base stations 3 and 5, respectively. The access networks are typically controlled by at least one appropriate controllers (not shown for clarity).

A controller may be assigned for each base station or a controller can control a plurality of base stations. Solutions wherein controllers are provided both in individual base stations and in the radio access network level for controlling a plurality of base stations are also known. It shall thus be appreciated that the name, location and number of the network controllers depends on the system.

The base stations 2 and 5 are arranged to transmit signals to and receive signals from the mobile user equipment 1 of a mobile user i.e. subscriber via a wireless interface. Correspondingly, the mobile user equipment 1 is able to transmit signals to and receive signals from the base station via the wireless interface. The mobile user may use any appropriate mobile device adapted for Internet Protocol (IP) communication to connect the network. For example, the mobile user may access the cellular network by means of a Personal computer (PC), Personal Data Assistant (PDA), mobile station (MS) and so on. The following examples are described in the context of mobile stations.

One skilled in the art is familiar with the features and operation of a typical mobile station. Thus, a detailed explanation of these features is not necessary. It is sufficient to note that the user may use the mobile station 1 for tasks such as for making and receiving phone calls, for receiving and sending data from and to the network and for experiencing e.g., multimedia content. The mobile station may include an antenna element for wirelessly receiving and transmitting signals from and to base stations of the mobile communication network. The mobile station 1 may also be provided with a display for displaying images and other graphical information for the user of the mobile user equipment. Speaker means are also typically provided. The operation of the mobile user equipment may be controlled by means of an appropriate user interface such as control buttons, voice commands and so on. Furthermore, a mobile user equipment is provided with a processor entity and a memory means. It shall be appreciated that although only one mobile station is shown in FIG. 1 for clarity, a number of mobile stations may be in simultaneous communication with each base station of the mobile communication system.

It shall be appreciated that the FIG. 1 presentation is highly schematic and that in practical implementations the number of base stations would be substantially higher, especially in network 2. One communication network may have a plurality of radio access networks.

In the current third generation (3G) wireless IP multimedia network architectures it is assumed that several different server entities are used for handling different functions. These include entities that handle call session control functions (CSCFs). The call session functions may be divided into various categories such as a proxy call session control function (P-CSCF), interrogating call session control function (I-CSCF), and serving call session control function (S-CSCF). For clarity, FIG. 1 shows only the S-CSCF 12.

The serving call session control function 12 forms an entity whereto the subscriber 10 shall be registered at. The registration is required in order to be able to request for a service from the communication system. A user may register himself via any appropriate access system, such as the shown networks 2 and 4.

In FIG. 1 the user 1 is shown to have a plurality of contacts 7 registered at the controller entity 12. More particularly, contact addresses 'contact 1 (q1)' to 'contact x (qx)' are provided via the GPRS network 2. Contact addresses 'contact 2 (q2)' to 'contact y (qy)' are provided via the WLAN network 4. All these contact are registered at the contact register 14 of the controller entity 12.

A subscriber information storage is shown to be provided by a home subscriber server (HSS) 20. The home subscriber server (HSS) 20 is for storing subscriber i.e. user related information. The home subscriber server (HSS) can be queried by other function entities over the appropriate interfaces, e.g. during session set-up procedures. The subscriber information conventionally includes information such as authentication data (e.g. registration identities of the subscriber or the terminals) and so on. The HSS can also be used for storing permanently subscriber profile information.

This example of the invention relates to call set-up procedures when user 6 tries to make a call to the mobile user 1 who has multiple registrations at the serving call state control function 12. It may occur that the called user 2 has not indicated to the S-CSCF 12 any preferences for forking of incoming requests via its registration, for example by using the q values. The calling user 6 has not indicated any preferences either, for example by using the above discussed 'Request-Disposition' header field.

To avoid an undefined situation, the user profile 22 stored in the subscriber information storage 20 contains information regarding how the incoming requests shall be handled. The implementation of the use of this information may be similar to the fork-directive and the parallel-directive as described above. The operator of the HSS 20 is preferably able to provision the information stored in the HSS. The operator is also preferably able to modify the statically stored information.

Figure 2:
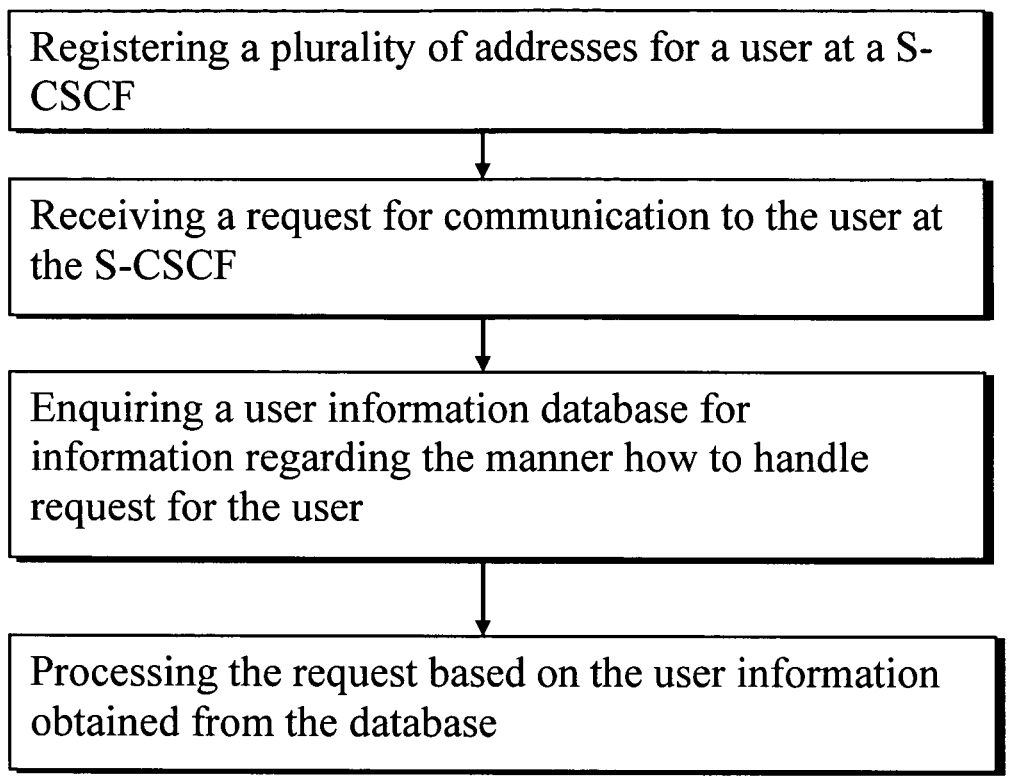
FIG. 2 is a flowchart illustrating the operation of one embodiment of the invention.

In the operation, a plurality of addresses for a user may be registered at a S-CSCF 12 at step 30 of FIG. 2. An incoming request may arrive at step 31 to the S-CSCF 12 to be terminated for the mobile user 1. The user 1 has not indicated any q values via registration to the S-CSCF 12. Neither does the incoming request have any preferences of the caller, for example by means of the 'Request-Disposition' header field. In such situation the S-CSCF 12 may query a user information database at step 32. The request may then be processed at step 33 in accordance with the user profile 22 stored in the HSS 20.

For example, the user profile 22 may be configured to indicate the following alternatives: proxy to only a single contact (no forking), proxy the request to all known addresses at once (parallel forking), or proxy the request sequentially. In the last case the order may be randomly chosen (sequential search). In certain applications two options might be enough. For example, the options may be no forking and sequential forking. More than three options may also be used.

The processing may occur in accordance with the information from the user information storage only if no user preference has been indicated for the known contact addresses. For example, any preference indicated by the request may overrun the information from the user information storage. Alternatively, the user information may not even be queried if the request includes a preference, or if the preference is otherwise known.

The query may only be applied to a sub-group of the known contact addresses. For example, the sub-group may include the WLAN or GPRS addresses in FIG. 1.

Handling instructions may be indicated and assigned for each contact address independently during their registration at the controller entity 12. The handling instructions may be indicated and assigned for each contact address by the user equipment 1 or the user information storage.

It should be appreciated that while embodiments of the invention have been described in relation to mobile stations, embodiments of the invention are applicable to any other suitable type of user equipment.

The examples of the invention have been described in the context of an IMS system and GPRS and WLAN networks. This invention is also applicable to any other access techniques including code division multiple access, frequency division multiple access or time division multiple access as well as any hybrids thereof. Furthermore, the given examples are described in the context of the so called all SIP networks with all SIP entities. This invention is also applicable to any other appropriate communication systems, either wireless or fixed line systems and standards and protocols. Examples of other possible communication systems enabling wireless data communication services, without limiting to these, include third generation mobile communication system such as the Universal Mobile Telecommunication System (UMTS), i-phone or CDMA2000 and the Terrestrial Trunked Radio (TETRA) system, the Enhanced Data rate for GSM Evolution (EDGE) mobile data network. Examples of fixed line systems include the diverse broadband techniques providing Internet access for users in different locations, such as at home and offices. Regardless the standards and protocols used for the communication network, the invention can be applied in all communication networks wherein registration in a network entity is required.

The embodiments of the invention have been discussed in the context of a servicing call state control function. Embodiments of the invention can be applicable to other network elements where applicable.

In addition or as an alternative to the home subscriber server (HSS) 20 described above, the required user information may be obtained from any appropriate database configured to store user specific information.

It shall also be appreciated that in addition to the serving control entity 12, the user may need to be associated with a proxy control entity. The proxy entity may be assigned to an area within which the user has roamed. Thus, when a user accesses the network through an arbitrary type of access network the access network may assign a proxy control entity for controlling the accessed services from that network point of view, e.g. for bandwidth management. It is also possible that the user may search and find an appropriate P-CSCF with his user equipment without help from the access network. The other possible call state control function entities are omitted from FIG. 1 for clarity.

It is also noted herein that while the above describes exemplifying embodiments of the invention, there are several variations and modifications which may be made to the disclosed solution without departing from the scope of the invention as defined in the appended claims.

The invention claimed is:

1. A method, comprising:
registering, in a controller entity comprising a call state control function, a plurality of contact addresses for a user;
receiving, at the controller entity, a request for a communication link to the user;
querying, by the controller entity, a database at a home subscriber server for information regarding a manner regarding how to handle the request; and
processing, at the controller entity, the request based on the queried information from the database, wherein, when provided during registration, the controller entity uses user preference information to determine whether to fork the request in parallel or sequentially.

2. The method as claimed claim 1, wherein the registering comprises registering the plurality of contact addresses for the user in the controller entity which is provided in association with a multimedia network.

3. The method as claimed in claim 1, wherein the registering comprises the user registering the plurality of contact addresses in at least two different communication networks.

4. The method as claimed in claim 1, wherein the querying comprises applying a query to a sub-group of known contact addresses.

5. The method as claimed claim 1, further comprising indicating and assigning handling instructions for at least one contact address independently during registration of the at least one contact address.

6. The method as claimed in claim 5, wherein the indicating and assigning comprises indicating and handling the handling instructions for the at least one contact address by either the user or the database.

7. An apparatus, comprising:
at least one processor; and
at least one memory, wherein the at least one processor and the at least one memory provide operations comprising:
registering, in a controller entity comprising a call state control function, a plurality of contact addresses for a user;
receiving, at the controller entity, a request for a communication link to the user;
querying, by the controller entity, a database at a home subscriber server for information regarding a manner regarding how to handle the request; and
processing, at the controller entity, the request based on the queried information from the database, wherein, when provided during registration, the controller entity uses user preference information to determine whether to fork the request in parallel or sequentially.

8. An apparatus comprising:
registration means for registering, in a controller entity comprising a call state control function, a plurality of contact addresses for a user;
interface means, at a controller entity, for interfacing to a database for storing information regarding how to handle a request for the user;
querying means for querying, by the controller entity, the database at a home subscriber server for information regarding a manner regarding how to handle the request; and
processing means for processing, at the controller entity, the request based on the queried information from the database, wherein, when provided during registration, the controller entity uses user preference information to determine whether to fork the request in parallel or sequentially.

9. The apparatus as claimed claim 7, wherein the apparatus is provided in association with a multimedia network.

10. The apparatus as claimed in claim 7, wherein the registering is configured to register the plurality of contact addresses in at least two different communication networks.

11. The apparatus as claimed in claim 7, wherein the querying applies a query to a sub-group of known contact addresses.

12. The apparatus as claimed claim 7, further comprising receiving handling instructions for at least one contact address during registration of the at least one contact address.

13. The apparatus as claimed in claim 12, wherein the handling instructions are received from at least one of the user or the database.

14. The method of claim 1, wherein the request comprises a session initiation protocol request.

15. The method of claim 1, wherein the call state control function is a serving call state control function.

* * * * *